US012528679B2

(12) United States Patent
Cui

(10) Patent No.: US 12,528,679 B2
(45) Date of Patent: Jan. 20, 2026

(54) HYRAULIC JACK

(71) Applicant: Ningbo Lianda Winch Co., Ltd., Ningbo (CN)

(72) Inventor: Xiaojun Cui, Ningbo (CN)

(73) Assignee: NINGBO LIANDA WINCH CO., LTD., Ningbo (CN)

( * ) Notice: Subject to any disclaimer, the term of this patent is extended or adjusted under 35 U.S.C. 154(b) by 342 days.

(21) Appl. No.: 18/490,699

(22) Filed: Oct. 19, 2023

(65) Prior Publication Data

US 2024/0158212 A1 May 16, 2024

(30) Foreign Application Priority Data

Nov. 10, 2022 (CN) ........................ 202222985854.2

(51) Int. Cl.

| | |
|---|---|
| ***B66F 1/08*** | (2006.01) |
| ***B66F 3/26*** | (2006.01) |
| ***B66F 3/32*** | (2006.01) |
| ***F15B 15/14*** | (2006.01) |

(52) U.S. Cl.

CPC .................. *B66F 3/32* (2013.01); *B66F 3/26* (2013.01); *F15B 15/1428* (2013.01); *F15B 15/1457* (2013.01)

(58) Field of Classification Search

CPC ...... B66F 1/00; B66F 1/08; B66F 3/00; B66F 3/24; B66F 3/247; B66F 5/00; B66F 7/00; B66F 7/08

See application file for complete search history.

(56) References Cited

U.S. PATENT DOCUMENTS

| | | | | |
|---|---|---|---|---|
| 11,691,857 | B2 * | 7/2023 | Peacemaker | B60S 9/08 254/424 |
| 12,410,824 | B2 * | 9/2025 | Zhan | F15B 15/149 |
| 2018/0141791 | A1 * | 5/2018 | Jones | E01D 22/00 |
| 2022/0381265 | A1 * | 12/2022 | Zhan | B66F 3/28 |

FOREIGN PATENT DOCUMENTS

| | | | | |
|---|---|---|---|---|
| CN | 218778684 U | * | 3/2023 | B66F 3/26 |

* cited by examiner

*Primary Examiner* — Lee D Wilson

(74) *Attorney, Agent, or Firm* — Getech Law LLC; Jun Ye

(57) ABSTRACT

A hydraulic jack is provided which comprises a piston cylinder, a piston rod, an oil passage switching valve and an internal cylinder. The oil passage switching valve is provided with an oil outlet; a one-way valve assembly preventing the backflow of the oil outlet passage is disposed between the first oil inlet passage and the oil outlet passage; a return oil inlet passage is disposed at the bottom of the piston head; a return oil chamber in communication with the return oil inlet passage is disposed inside the piston head; a return oil outlet passage communicating the return oil chamber and the piston cylinder oil storage chamber is disposed on the piston head; a one-way return oil assembly is mounted in the return oil chamber, thus the hydraulic oil does not enter the hydraulic area and finally the top plate will not rise continuously along with pressing, providing overload protection.

10 Claims, 6 Drawing Sheets

D

HYRAULIC JACK

This application is based upon and claims priority to Chinese Patent Application No. 202222985854.2, filed on Nov. 10, 2022, the entire contents of which are incorporated herein by reference.

TECHNICAL FIELD

The present invention relates to the technical field of hydraulic jacks and in particular to a hydraulic jack.

BACKGROUND

An existing hydraulic jack is as disclosed in the Chinese invention patent (publication number CN114084834A), which comprises a base, an internal cylinder, an external housing, a top cover, a piston pipe, a hydraulic rod and an oil passage switching valve. The piston pipe is disposed in the internal cylinder and fixedly connected to the top cover; the hydraulic rod is disposed inside the piston pipe and movably connected to the top cover to perform up and down movement inside the piston pipe; the oil passage switching valve is fixedly connected to an end of the piston pipe away from the top cover to divide an internal area of the internal cylinder into a second oil storage area and a hydraulic area; when the hydraulic rod is controlled to run away from the base, hydraulic oil in the second oil storage area enters the piston pipe through an oil inlet; when the hydraulic rod is controlled to run close to the base, the hydraulic oil in the piston pipe enters the hydraulic area through an oil outlet.

The hydraulic rod in the above hydraulic jack is only one straight rod capable of performing up and down movement. In use, the hydraulic rod is pressed by hand to continuously press the hydraulic oil in the oil storage area into the hydraulic area, such that the hydraulic oil in the hydraulic area gradually increases, thus gradually lifting the top plate. Because the upper limit range in which the top plate ascends is unknown, pressing is continued to convey the hydraulic oil in the oil storage area into the hydraulic area and thus cause the top plate to continuously ascend. In this case, the top plate may rise excessively to overload the hydraulic jack, bringing damage to the hydraulic jack. As a result, the service life of the hydraulic jack is affected and even the hydraulic jack cannot be used normally.

SUMMARY

The present invention aims to address the following problem: in use of the existing hydraulic jack, the top plate may rise to an excessive height which applies an excessive force to the hydraulic jack and thus damages the hydraulic jack, affecting normal use of the jack. For this reason, the following hydraulic jack is provided: when the top plate rises to a height, the hydraulic oil intended to be pressed into the hydraulic area from the oil storage chamber is transferred back to the oil storage chamber due to an excessive pressure of the hydraulic area, such that the hydraulic oil does not enter the hydraulic area and finally the top plate will not rise continuously along with pressing, providing overload protection for the hydraulic jack and ensuring normal use of the hydraulic jack.

For the purpose of the present invention, the following technical solution is implemented.

There is provided a hydraulic jack, which comprises a piston cylinder, a piston rod, an oil passage switching valve and an internal cylinder. The piston rod is disposed inside the piston cylinder and performs up and down movement in the piston cylinder; a piston cylinder oil storage chamber is formed between the piston rod and the piston cylinder; the oil passage switching valve is disposed at a lower end of the piston cylinder; the internal cylinder is sleeved outside the piston cylinder and an internal cylinder oil storage chamber is formed between the internal cylinder and the piston cylinder; a piston oil inlet passage communicating the piston cylinder oil storage chamber and the internal cylinder oil storage chamber is disposed on the piston cylinder; the oil passage switching valve is provided with a piston cylinder mounting groove; a lower end of the piston cylinder is mounted in the piston cylinder mounting groove; a first oil inlet passage is disposed at a groove bottom of the piston cylinder mounting groove; the oil passage switching valve is provided with an oil outlet passage in communication with the first oil inlet passage, and a one-way valve assembly for preventing the backflow of the oil outlet passage is disposed between the first oil inlet passage and the oil outlet passage; a lower end of the piston rod is connected with a piston head for opening or closing the first oil inlet passage; a return oil inlet passage is disposed at the bottom of the piston head; a return oil chamber in communication with the return oil inlet passage is disposed inside the piston head; a return oil outlet passage communicating the return oil chamber and the piston cylinder oil storage chamber is disposed on the piston head; a one-way return oil assembly is mounted between the return oil inlet passage and the return oil outlet passage in the return oil chamber; the one-way return oil assembly is used to prevent the return oil outlet passage from flowing back to the return oil inlet passage. When a pressure of a hydraulic chamber is less than an acting force of the one-way return oil assembly, the pressure of the hydraulic chamber is unable to push open the one-way return oil assembly when the piston rod is pressed down such that the hydraulic oil is directly pressed into the hydraulic chamber, so as to lift the top plate assembly of the hydraulic jack. When the hydraulic oil pressure of the hydraulic chamber exceeds the acting force of the one-way return oil assembly, the hydraulic oil pressure pushes open the one-way return oil assembly such that the hydraulic oil originally intended to be pressed into the hydraulic chamber is pressed back into the internal cylinder oil storage chamber through the return oil inlet passage, the return oil chamber and the return oil outlet passage. In this way, no more hydraulic oil is pressed into the hydraulic chamber and the top plate assembly of the hydraulic jack is prevented from rising excessively and hence overload protection is provided to the hydraulic jack, ensuring normal use of the hydraulic jack.

Preferably, a thread column is disposed at the bottom end of the piston rod; a thread hole is disposed on the piston head; the thread hole is thread-connected to the thread column. The one-way return oil assembly comprises a return oil spring, a return oil press rod and a return oil steel bead; a step is disposed on the return oil press rod; the return oil spring is sleeved on the return oil press rod, an upper end of the return oil spring is abutted against the thread column, and a lower end of the return oil spring is abutted against the step; the return oil steel bead is located between the return oil press rod and the return oil inlet passage, and a diameter of the return oil press rod is greater than a hole diameter of the return oil inlet passage; the return oil press rod is abutted against the return oil steel bead to close the return oil inlet passage. The thread hole and the thread column facilitate mounting process and ensure the connectivity of both. The return oil spring is abutted against the return oil press rod, and the return oil press rod is abutted against the return oil steel bead and thus, the return oil steel bead closes the return oil inlet passage. Meanwhile, when the piston rod drives the piston head to press down, a part of hydraulic oil pushes the return oil steel bead through the return oil inlet passage such that the hydraulic oil flows toward the return oil outlet passage from the return oil inlet passage, preventing more hydraulic oil being pressed into the hydraulic chamber and preventing the top plate assembly from rising excessively, and thus providing overload protection for the hydraulic jack.

Preferably, a length of the thread column is less than a length of the thread hole and an adjusting screw is thread-connected in the thread hole. Further, the adjusting screw is located between the return oil press rod and the thread column. An upper end of the return oil spring is abutted against the adjusting screw and a lower end of the return oil spring is abutted against the return oil press rod. The greater length of the thread hole facilitates thread-connection of the adjusting screw in the thread hole. By adjusting the position of the adjusting screw, the pressure of the return oil spring on the return oil steel bead can be changed and hence, a pressure value can be better selected and set to achieve pressure adjustment.

Preferably, the bottom of the return oil press rod is provided with an upwardly-concave steel bead limiting recess; the top of the return oil steel bead is limited in the steel bead limiting recess. By using the steel bead limiting recess, the return oil steel bead can be better clamped to fully close the return oil inlet passage.

Preferably, the section of the return oil inlet passage is axially disposed and the section of the return oil outlet passage is radially disposed. In a case of closing, the return oil steel bead is located below the return oil inlet passage. The axially-disposed return oil inlet passage helps the piston head to performing opening and closing operation, while the radially-disposed return oil outlet passage helps the return oil to go out. In this case, the hydraulic oil flows back into the piston cylinder oil storage chamber.

Preferably, a sealing ring is disposed around a lower portion of the piston head; and the sealing ring is abutted between the piston head and the piston cylinder. With the sealing ring, the sealing performance between the piston head and the piston cylinder can be further improved. A part of hydraulic oil flowing upward and back into the piston cylinder oil storage chamber through a clearance between the piston head and the piston cylinder when the piston head presses down can be reduced.

Preferably, the section of the first oil inlet passage is axially disposed, and the oil passage switching valve is provided with a second oil inlet passage in communication with the internal cylinder oil storage chamber; the section of the second oil inlet passage is axially disposed; the oil passage switching valve is provided with an inlet oil converging passage; the section of the inlet oil converging passage is radially disposed, and the inlet oil converging passage communicates respectively with an oil outlet end of the first oil inlet passage and an oil outlet end of the second oil inlet passage; the section of the oil outlet passage is axially disposed, an oil inlet end of the oil outlet passage communicates with an oil outlet end of the inlet oil converging passage, and the one-way valve assembly is disposed inside the inlet oil converging passage. The use of the inlet oil converging passage helps collect the hydraulic oil coming from the first oil inlet passage and the second oil inlet passage, and converge it into the inlet oil converging passage at the same time, thus helping the one-way valve assembly to perform unidirectional control. Therefore, it is not required to mount a one-way valve in each passage, promoting oil feeding and solving the problem of return oil.

Preferably, the inlet oil converging passage comprises a converging small passage and a converging large passage; the converging small passage communicates respectively with the oil outlet end of the first oil inlet passage and the oil outlet end of the second oil inlet passage; the one-way valve assembly comprises a small steel bead, a small spring, a large steel bead and a large spring; the small steel bead is located within the converging small passage and the large steel bead is located within the converging large passage; an end of the small spring is abutted against the small steel bead to close the oil outlet end of the second oil inlet passage; the other end of the small spring is abutted against one side of the large steel bead; one end of the large spring is abutted against the other side of the large steel bead to enable the large steel bead to close the converging small passage; the other end of the large spring is abutted against one end of the converging large passage. By cooperation of the large spring and the large steel bead, the large steel bead is enabled to close the oil outlet end of the converging small passage, and by cooperation of the small spring and the small steel bead, the small steel bead is enabled to close the oil outlet end of the second oil inlet passage. When the hydraulic oil in the piston cylinder is fed, the hydraulic oil is enabled to flow through the first oil inlet passage toward the converging large passage, and will not be pressed out from the second oil inlet passage due to closing of the small steel bead, and finally flows out from the oil outlet passage, thus lifting the top plate of the hydraulic jack.

Preferably, a spring limiting column is axially disposed at an end of the converging large passage on the oil passage switching valve, and the large spring is abutted against the spring limiting column. With the spring limiting column, the large spring can be better limited and the travel of the converging large passage can be shortened at the same time. Thus, the acting force that the large spring applies to the large steel bead is larger, better improving the closing of the converging small passage and increasing the unidirectional passage effect.

Preferably, the hydraulic jack further comprises a base, an external cylinder, a top cover, and a top plate assembly; the base is fixedly connected to the bottom of the internal cylinder; the external cylinder is sleeved outside the internal cylinder and connected to the internal cylinder in a lift-sliding manner; an external cylinder oil storage chamber is formed between the external cylinder and the internal cylinder; the top cover is fixedly connected to the top of the external cylinder, and the top cover is connected with a handle assembly; a handle limiting sleeve is sleeved on a peripheral wall of the external cylinder and a handle limiting clamping mouth matching the handle assembly is disposed on the handle limiting sleeve; the top plate assembly is fixed on the external cylinder in a lift-adjustable manner.

In conclusion, the present invention has the following advantages: when the pressure of the hydraulic chamber is less than an acting force of the return oil steel bead, the return oil steel bead cannot be pushed away when the piston rod presses down so as to directly press the hydraulic oil into the hydraulic chamber, thus lifting the top plate of the hydraulic jack; when pressure of the hydraulic chamber exceeds the acting force of the return oil steel bead, the return oil steel bead is pushed away when the piston rod presses down, so as to enable to the hydraulic oil to flow back into the internal cylinder oil storage chamber through the return oil inlet passage, the return oil chamber and the return oil outlet passage. In this way, no more hydraulic oil is pressed into the hydraulic chamber and overload of the hydraulic jack is avoided and hence effective protection is provided to the hydraulic jack.

The numerals of the drawings are described below: 1. piston cylinder, 11. piston cylinder oil storage chamber, 12. piston oil inlet passage, 2. piston rod, 20. thread column, 21. piston head, 210. adjusting screw, 211. thread hole, 212. sealing ring, 22. return oil inlet passage, 23, return oil chamber, 24. return oil outlet passage, 3. oil passage switching valve, 31. piston cylinder mounting groove, 32. first oil inlet passage, 33. oil outlet passage, 34. second oil inlet passage, 35. inlet oil converging passage, 351. converging small passage, 352. converging large passage, 36. spring limiting column, 4. internal cylinder, 41. internal cylinder oil storage chamber, 5. one-way valve assembly, 51. small steel bead, 52. small spring, 53. large steel bead, 54. large spring, 6. one-way, return oil assembly, 61. return oil spring, 62. return oil press rod, 621. step, 622. steel bead limiting recess, 63. return oil steel head, 7. base, 8. external cylinder, 81. external cylinder oil storage chamber, 9. top cover, 91. handle assembly, 911. handle, 92. handle limiting sleeve, 93. handle limiting clamping mouth, 10. top plate assembly.

DETAILED DESCRIPTIONS OF EMBODIMENTS

In order to make the above Objects, features and advantages of the present invention clearer and more intelligible, the specific embodiments of the present invention will be detailed below in combination with accompanying drawings.

Figure 1:
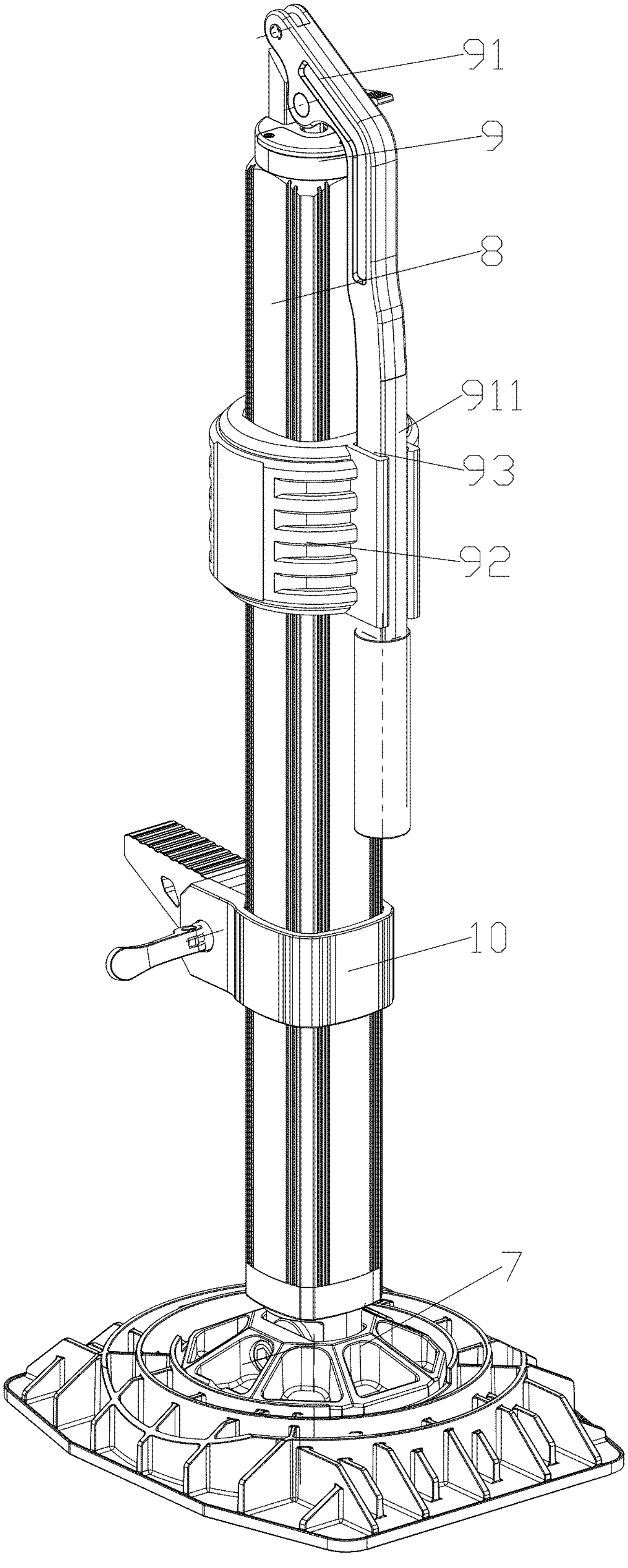
FIG. 1 is a structural schematic diagram illustrating a hydraulic jack according to the present invention.
Figure 2:
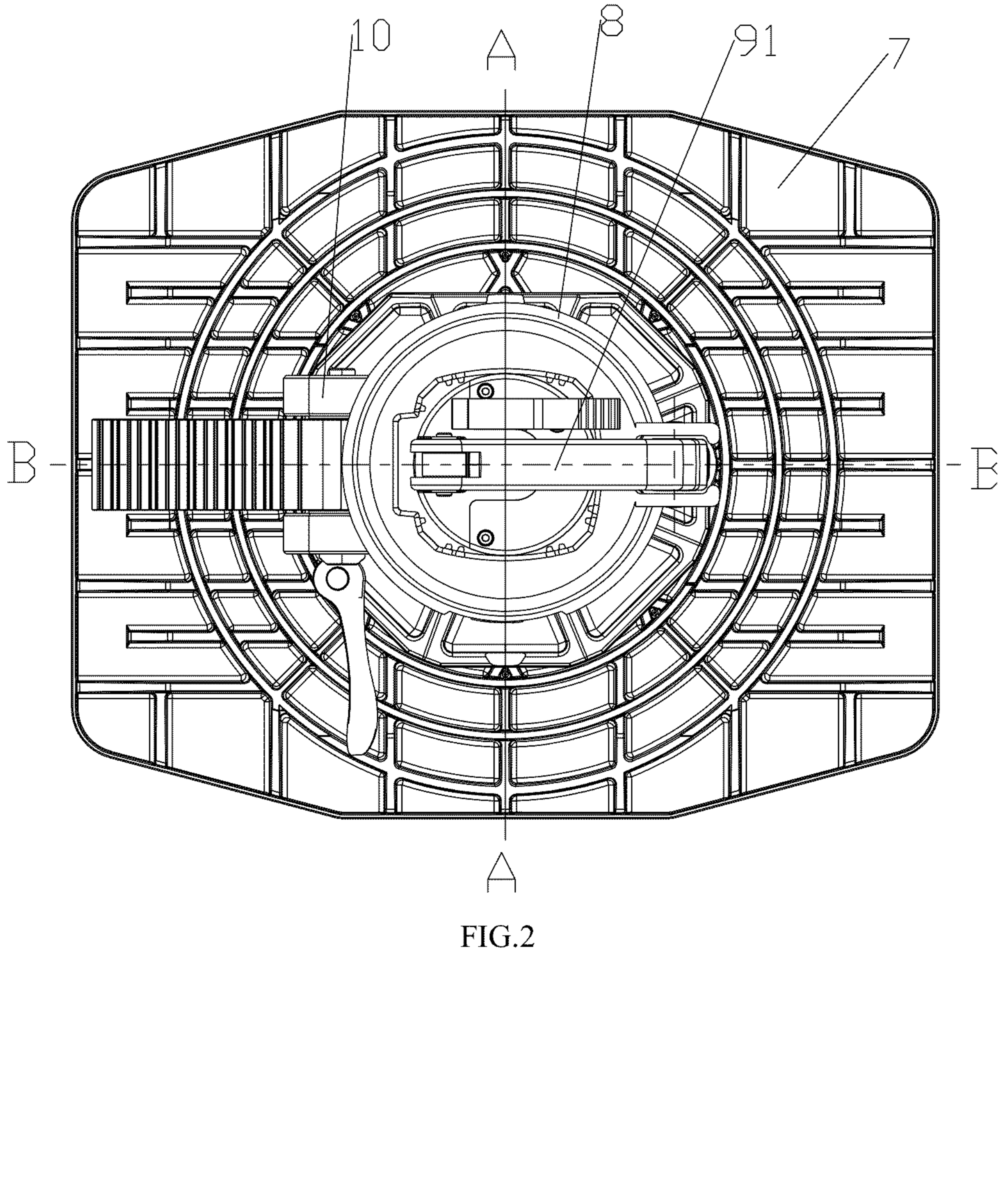
FIG. 2 is a plane schematic diagram lustrating a hydraulic jack according to the present invention.
Figure 3:
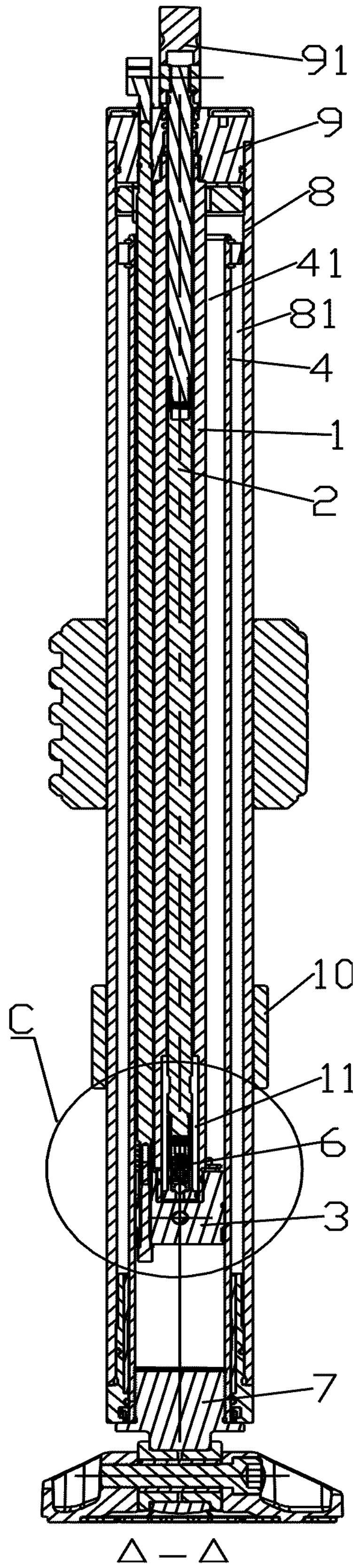
FIG. 3 is a sectional view taken along A-A in FIG. 2 according to the present invention.
Figure 4:
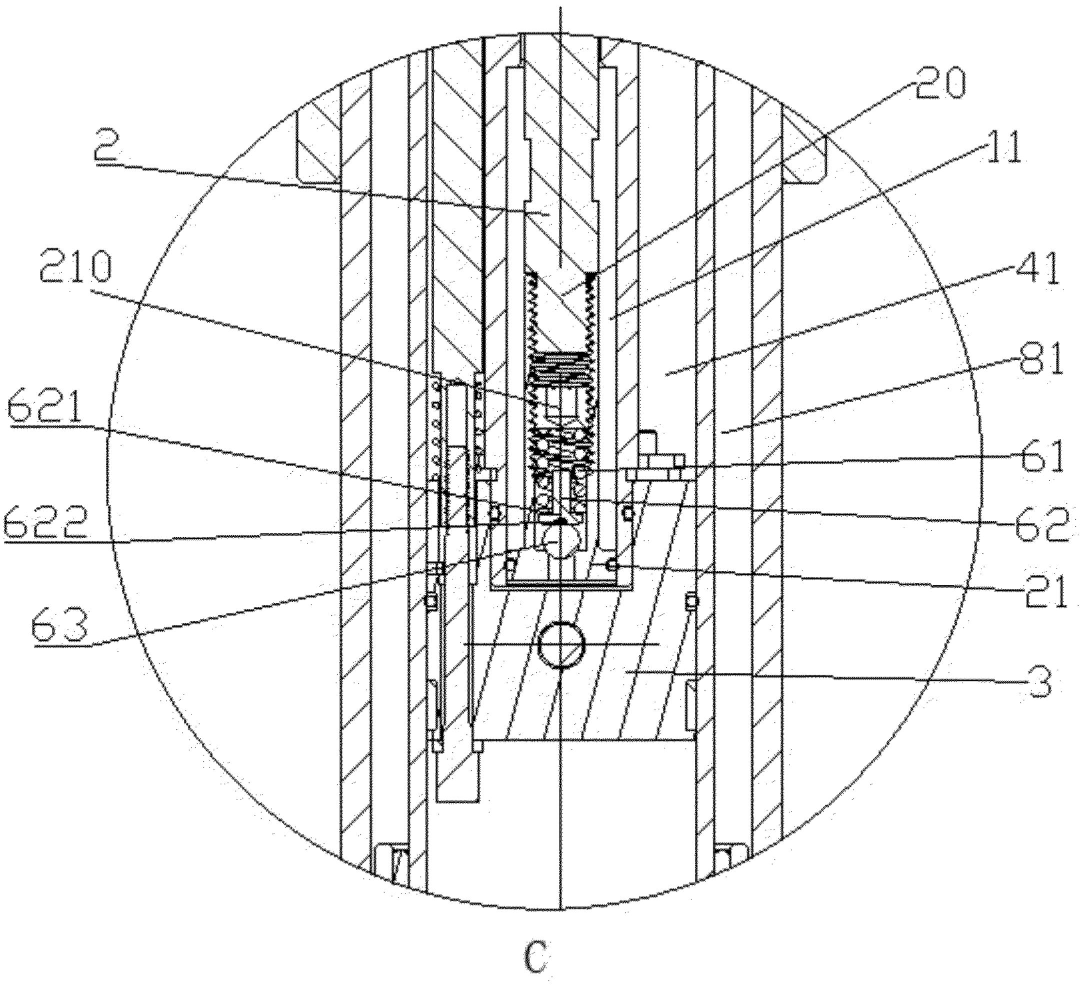
FIG. 4 is a partially enlarged view of the position C in FIG. 3 according to the present invention.
Figure 5:
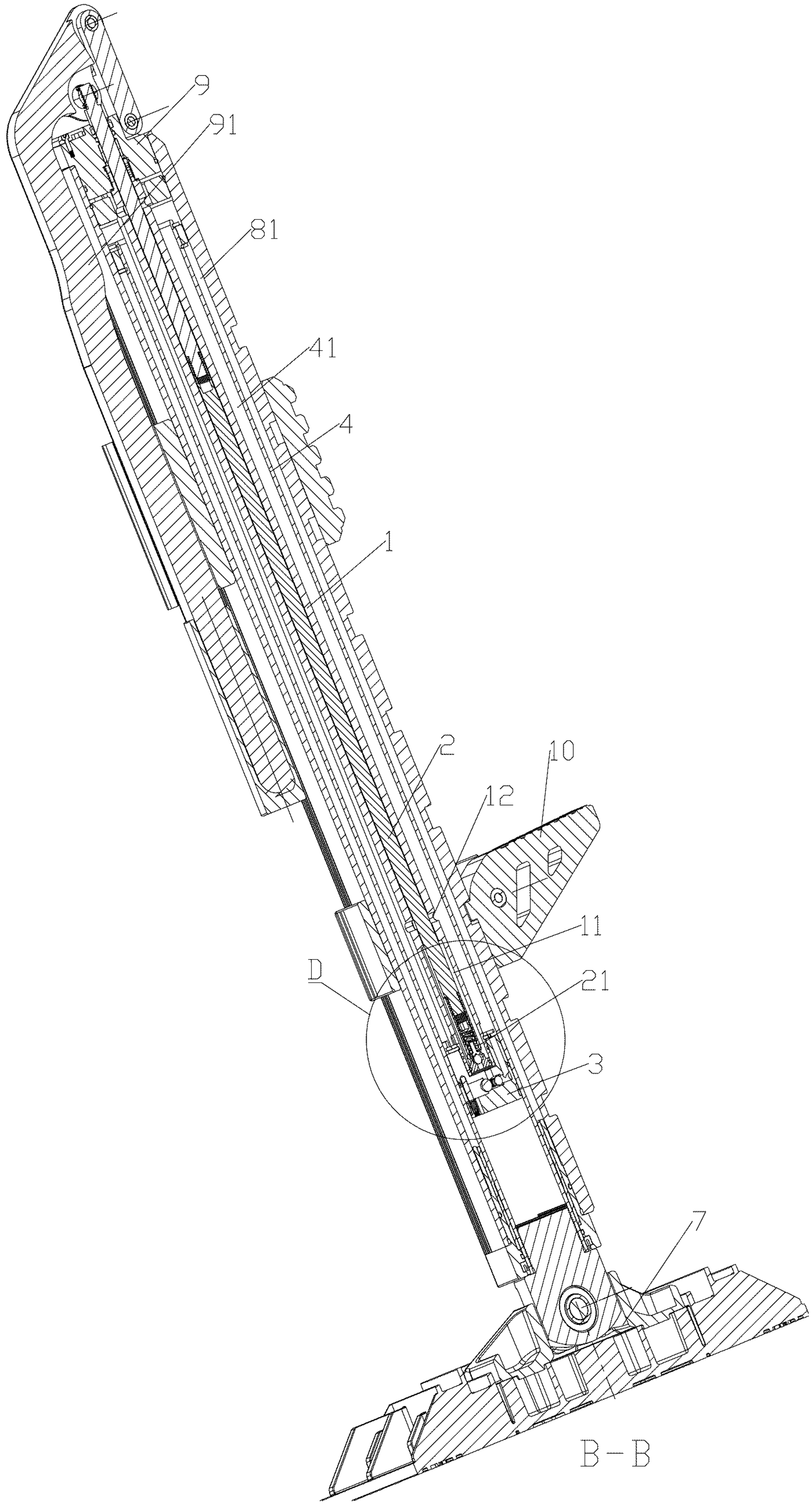
FIG. 5 is a sectional view taken along B-B in FIG. 2 according to the present invention.

As shown in FIG. 1, the top of the FIG. 1 refers to the upper and the bottom of the FIG. 1 refers to the lower.

As shown in FIGS. 1 to 6, there is provided a hydraulic jack, which comprises a piston cylinder 1, a piston rod 2, an oil passage switching valve 3, an internal cylinder 4, a base 7, an external cylinder 8, a top cover 9, and a top plate assembly 10; the piston rod 2 is disposed inside the piston cylinder 1 and can perform up and down movement inside the piston cylinder 1; a piston cylinder oil storage chamber 11 is formed between the piston rod 2 and the piston cylinder 1; the oil passage switching valve 3 is disposed at a lower end of the piston cylinder 1; the internal cylinder 4 is sleeved outside the piston cylinder 1 and an internal cylinder oil storage chamber 41 is formed between the internal cylinder 4 and the piston cylinder 1; a piston oil inlet passage 12 communicating the piston cylinder oil storage chamber 11 and the internal cylinder oil storage chamber 41 is disposed on the piston cylinder 1; the base 7 is fixedly connected to the bottom of the internal cylinder 4; the external cylinder 8 is sleeved outside the internal cylinder 4 and connected to the internal cylinder 4 in a lift-sliding manner; an external cylinder oil storage chamber 81 is formed between the external cylinder 8 and the internal cylinder 4; the top cover 9 is fixedly connected to the top of the external cylinder 8, and the top cover 9 is connected with a handle assembly 91; a handle limiting sleeve 92 is sleeved on a peripheral wall of the external cylinder 8 and a handle limiting clamping mouth 93 matching the handle assembly 91 is disposed on the handle limiting sleeve 92; when the handle assembly 91 is not used, a handle 911 of the handle assembly 91. is longitudinally disposed and clamped in the handle limiting clamping mouth 93, which reduces occupation area and facilitates fixing the handle 911 to avoid driving the handle 911 to act; the top plate assembly 10 is fixed on the external cylinder 8 in a lift-adjustable manner.

As shown in FIGS. 1 to 6, the oil passage switching valve 3 is provided with a piston cylinder mounting groove 31; a lower end of the piston cylinder 1 is mounted in the piston cylinder mounting groove 31; a first oil inlet passage 32 is disposed at a groove bottom of the piston cylinder mounting groove 31; the oil passage switching valve 3 is provided with an oil outlet passage 33 in communication with the first oil inlet passage 32, and a one-way valve assembly 5 for preventing the backflow of the oil outlet passage 33 is disposed between the first oil inlet passage 32 and the oil outlet passage 33; a lower end of the piston rod 2 is connected with a piston head 21 for opening or closing the first oil inlet passage 32; a return oil inlet passage 22 is disposed at the bottom of the piston head 21; a return oil chamber 23 in communication with the return oil inlet passage 22 is disposed inside the piston head 21; a return oil outlet passage 24 communicating the return oil chamber 23 and the piston cylinder oil storage chamber 11 is disposed on the piston head 21; a one-way return oil assembly 6 is mounted between the return oil inlet passage 22 and the return oil outlet passage 24 in the return oil chamber 23; the one-way return oil assembly 6 is used to prevent the return oil outlet passage 24 from flowing back to the return oil inlet passage 22. When a pressure of a hydraulic chamber is less than an acting force of the one-way return oil assembly 6, the pressure of the hydraulic chamber is unable to push open the one-way return oil assembly 6 when the piston rod 2 is pressed down such that the hydraulic oil is directly pressed into the hydraulic chamber, so as to lift the top plate assembly 10 of the hydraulic jack. When the hydraulic oil pressure of the hydraulic chamber exceeds the acting force of the one-way return oil assembly 6, the hydraulic oil pressure pushes open the one-way return oil assembly 6 such that the hydraulic oil originally intended to be pressed into the hydraulic chamber is pressed back into the internal cylinder oil storage chamber 41 through the return oil inlet passage 22, the return oil chamber 23 and the return oil outlet passage 24. In this way, no more hydraulic oil is pressed into the hydraulic chamber and the top plate assembly 10 of the hydraulic jack is prevented from rising excessively and hence overload protection is provided to the hydraulic jack, ensuring normal use of the hydraulic jack.

As shown in FIGS. 3 to 6, a thread column 20 is disposed at the bottom end of the piston rod 2; a thread hole 211 is disposed on the piston head 21; the thread hole 211 is thread-connected to the thread column 20, which facilitates mounting process and ensures the connectivity of both. The one-way return oil assembly 6 comprises a return oil spring 61, a return oil press rod 62 and a return oil steel bead 63; a step 621 is disposed on the return oil press rod 62; the return oil spring 61 is sleeved on the return oil press rod 62, an upper end of the return oil spring 61 is abutted against the thread column 20, and a lower end of the return oil spring

61 is abutted against the step 621; the return oil steel bead 63 is located between the return oil press rod 62 and the return oil inlet passage 22, and a diameter of the return oil press rod 62 is greater than a hole diameter of the return oil inlet passage 22; the return oil press rod 62 is abutted against the return oil steel bead 63 to close the return oil inlet passage 22. Thus, the return oil spring is abutted against the return oil press rod 62, and the return oil press rod 62 is abutted against the return oil steel bead 63 and thus, the return oil steel bead 61 closes the return oil inlet passage 22. Meanwhile, when the piston rod 2 drives the piston head 21 to press down, if the pressure of the hydraulic chamber is greater than the acting force of the return oil steel bead 63, the hydraulic oil pushes away the return oil steel bead 63 through the return oil inlet passage 22 and hence flows toward the return oil outlet passage 24 from the return oil inlet passage 22, preventing more hydraulic oil being pressed into the hydraulic chamber and preventing the top plate assembly 10 from continuing rising, and thus providing overload protection for the hydraulic jack. The bottom of the return oil press rod 62 is provided with an upwardly-concave steel bead limiting recess 622; the top of the return oil steel bead 63 is limited in the steel bead limiting recess 622. By using the steel bead limiting recess 622, the return oil steel bead 63 can be better clamped to fully close the return oil inlet passage 22. The section of the return oil inlet passage 22 is axially disposed and the section of the return oil outlet passage 24 is radially disposed. In a case of closing, the return oil steel bead 63 is located below the return oil inlet passage 22. The axially-disposed return oil inlet passage 22 helps the piston head 21 to performing opening and closing operation, while the radially-disposed return oil outlet passage 24 helps the return oil to go out. In this case, the hydraulic oil flows back into the piston cylinder oil storage chamber 11.

Preferably, a length of the thread column 20 is less than a length of the thread hole 211 and an adjusting screw 210 is thread-connected in the thread hole 211. Further, the adjusting screw 210 is located between the return oil press rod 62 and the thread column 20. An upper end of the return oil spring 61 is abutted against the adjusting screw 210 and a lower end of the return oil spring 61 is abutted against the return oil press rod 62. The greater length of the thread hole 211 facilitates thread-connection of the adjusting screw 210 in the thread hole 211. By adjusting the position of the adjusting screw 210, the pressure of the return oil spring 61 on the return oil steel bead 63 can be changed and hence, a pressure value can be better selected and set to achieve pressure adjustment.

As shown in FIGS. 3 to 6, a sealing ring 212 is disposed around a lower portion of the piston head 21; and the sealing ring 212 is abutted between the piston head 21 and the piston cylinder 1. With the sealing ring 212, the sealing performance between the piston head 21 and the piston cylinder 1 can be further improved. A part of hydraulic oil flowing upward and back into the piston cylinder oil storage chamber 11 through a clearance between the piston head 21 and the piston cylinder 1 when the piston head 21 presses down can be reduced.

As shown in FIGS. 3 to 6, the section of the first oil inlet passage 32 is axially disposed, and the oil passage switching valve 3 is provided with a second oil inlet passage 34 in communication with the internal cylinder oil storage chamber 41; the section of the second oil inlet passage 34 is axially disposed; the oil passage switching valve 3 is provided with an inlet oil converging passage 35; the section of the inlet oil converging passage 35 is radially disposed, and the inlet oil converging passage 35 communicates respectively with an oil outlet end of the first oil inlet passage 32 and an oil outlet end of the second oil inlet passage 34; the section of the oil outlet passage 33 is axially disposed, an oil inlet end of the oil outlet passage 33 communicates with an oil outlet end of the inlet oil converging passage 35, and the one-way valve assembly 5 is disposed inside the inlet oil converging passage 35. The use of the inlet oil converging passage 35 helps collect the hydraulic oil coming from the first oil inlet passage 32 and the second oil inlet passage 34, and converge it into the inlet oil converging passage 35 at the same time, thus helping the one-way valve assembly 5 to perform unidirectional control. Therefore, it is not required to mount a one-way valve in each passage, promoting oil feeding and solving the problem of return oil.

Figure 6:
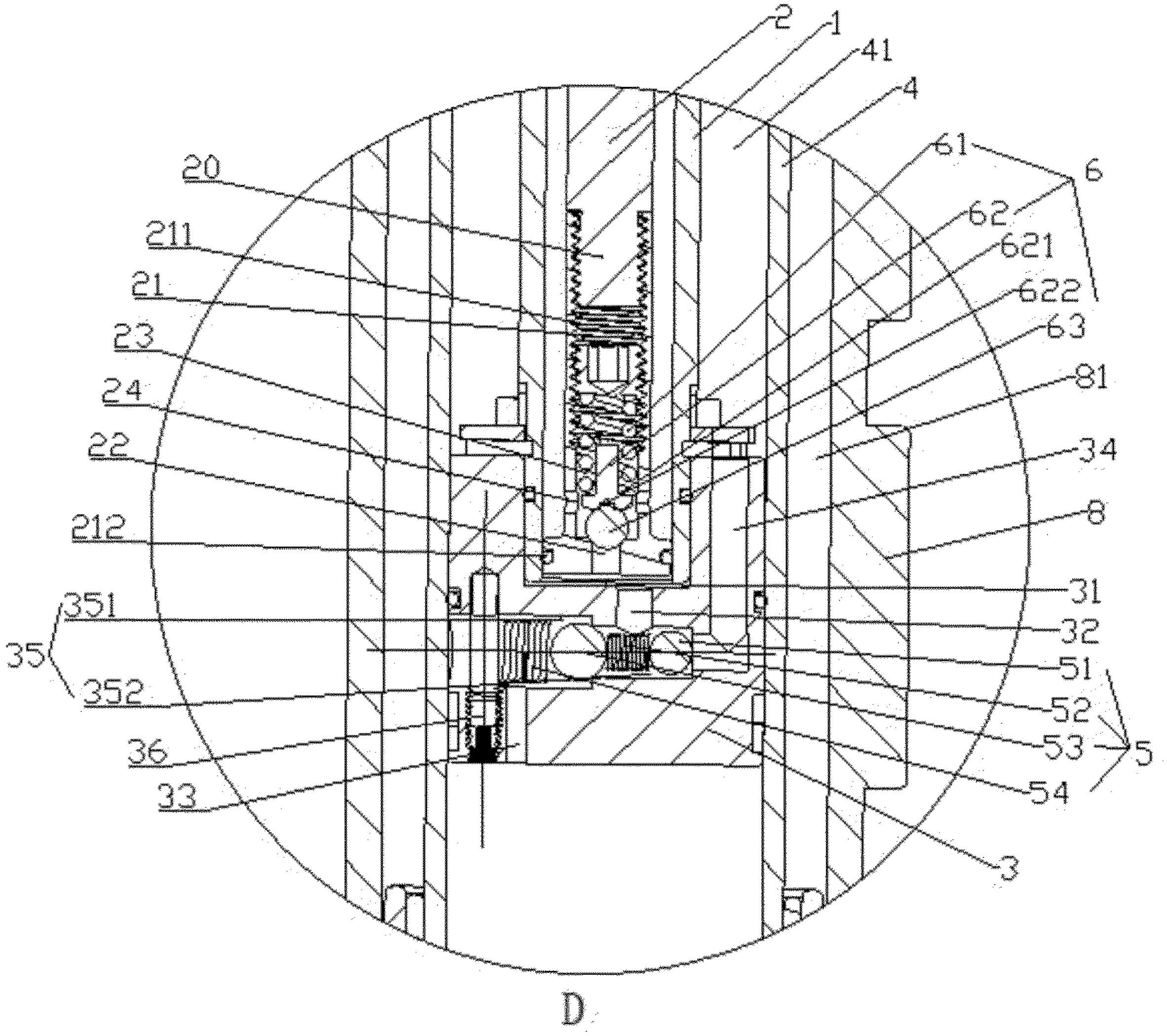
FIG. 6 is a partially enlarged view of the position D in FIG. 5 according to the present invention.

As shown in FIG. 6, the inlet oil converging passage 35 comprises a converging small passage 351 and a converging large passage 352; the converging small passage 351 communicates respectively with the oil outlet end of the first oil inlet passage 32 and the oil outlet end of the second oil inlet passage 34; the one-way valve assembly 5 comprises a small steel bead 51, a small spring 52, a large steel bead 53 and a large spring 54; the small steel bead 51 is located within the converging small passage 351 and the large steel bead 53 is located within the converging large passage 352; an end of the small spring 52 is abutted against the small steel bead 51 to close the oil outlet end of the second oil inlet passage 34; the other end of the small spring 52 is abutted against one side of the large steel bead 53; one end of the large spring 54 is abutted against the other side of the large steel bead 53 to enable the large steel bead 53 to close the converging small passage 351; the other end of the large spring 54 is abutted against one end of the converging large passage 352. By cooperation of the large spring 54 and the large steel bead 51, the large steel bead 53 is enabled to close the oil outlet end of the converging small passage 351, and by cooperation of the small spring 52 and the small steel bead 51, the small steel bead 51 is enabled to close the oil outlet end of the second oil inlet passage 34. When the hydraulic oil in the piston cylinder 1 is fed, the hydraulic oil is enabled to flow through the first oil inlet passage 32 toward the converging large passage 352, and will not be pressed out from the second oil inlet passage 34 due to closing of the small steel bead 51, and finally flows out from the oil outlet passage 33, thus lifting the top plate assembly 10 of the hydraulic jack. A spring limiting column 36 is axially disposed at an end of the converging large passage 352 on the oil passage switching valve 3, and the large spring 54 is abutted against the spring limiting column 36. With the spring limiting column 36, the large spring 54 can be better limited and the travel of the converging large passage 352 can be shortened at the same time. Thus, the acting force that the large spring 54 applies to the large steel bead 53 is larger, better improving the closing of the converging small passage 351 and increasing the unidirectional passage effect.

In use, the handle 911 of the handle assembly 91 is lifted upward to lift the piston rod 2, and the hydraulic oil firstly pushes away the small steel bead 51 from the second oil inlet passage 34 to enter the inlet oil converging passage 35, and pushes away the large steel bead 53 to enable the hydraulic oil in the internal cylinder oil storage chamber 41 to flow from the oil outlet passage 33 into the hydraulic chamber; meanwhile, the hydraulic oil of the piston cylinder oil storage chamber 11 in the piston cylinder 1 and the internal cylinder oil storage chamber 41 is enabled to enter under the piston cylinder 1 and located under the piston head 21; the handle assembly 91 is pressed down to enable the piston rod to press down, such that the piston head 21 presses the hydraulic oil below into the first oil inlet passage 32 of the oil passage switching valve 3, and discharges the hydraulic oil from the oil outlet passage 33 into the hydraulic chamber by pushing away the large steel bead 53 in the inlet oil converging passage 35 and thus, the oil passage switching valve 3 lifts the top plate assembly 10. After it is lifted to a given height, since there is some hydraulic oil in the hydraulic chamber, when the pressure of the hydraulic oil in the hydraulic chamber is greater than the acting force of the return oil steel bead 63, the return oil steel bead 63 can be pushed away in the process that the handle 911 of the handle assembly 91 drives the piston rod 2 to press down. In this way, the hydraulic oil originally intended to enter the hydraulic chamber flows back into the piston cylinder oil storage chamber 11 through the return oil inlet passage 22. As a result, no more hydraulic oil will be pressed into the hydraulic chamber, and the top plate 10 of the hydraulic jack is prevented from rising excessively and hence overload protection is provided to the hydraulic jack, ensuring normal use of the jack.

In conclusion, through comparison of the present invention and the existing hydraulic jack, it is shown that because the existing piston rod 2 is only one straight rod which cannot convey the hydraulic oil originally intended to be pressed into the hydraulic chamber back to the piston cylinder oil storage chamber 11, and thus the hydraulic oil is continuously pressed into the hydraulic chamber when the piston rod 2 continuously presses down; in this case, the top plate assembly 10 rises continuously to an excessive height, bringing overload to the hydraulic jack and thus damaging the hydraulic jack. In the present invention, it can be guaranteed that when the hydraulic oil in the hydraulic chamber exceeds a set pressure value, the return oil steel bead 63 can be pushed away when the piston rod 2 presses down, so as to enable the hydraulic oil to flow back to the internal cylinder oil storage chamber 41, preventing more hydraulic oil from being pressed into the hydraulic chamber, providing overload protection for the hydraulic jack, and ensuring normal use of the jack.

Although the present disclosure is made as above, the scope of protection of the present disclosure is not limited hereto. Those skilled in the art can make various changes and modifications without departing from the spirit and scope of the present disclosure. These changes and modifications shall fall within the scope of protection of the present invention.

The invention claimed is:

1. A hydraulic jack, comprising a piston cylinder (1), a piston rod (2), an oil passage switching valve (3) and an internal cylinder (4); the piston rod (2) is disposed inside the piston cylinder (1) and performs up and down movement in the piston cylinder (1); a piston cylinder oil storage chamber (11) is formed between the piston rod (2) and the piston cylinder (1); the oil passage switching valve (3) is disposed at a lower end of the piston cylinder (1); the internal cylinder (4) is sleeved outside the piston cylinder (1) and an internal cylinder oil storage chamber (41) is formed between the internal cylinder (4) and the piston cylinder (1); a piston oil inlet passage (12) communicating the piston cylinder oil storage chamber (11) and the internal cylinder oil storage chamber (41) is disposed on the piston cylinder (1), wherein the oil passage switching valve (3) is provided with a piston cylinder mounting groove (31); a lower end of the piston cylinder (1) is mounted in the piston cylinder mounting groove (31); a first oil inlet passage (32) is disposed at a groove bottom of the piston cylinder mounting groove (31); the oil passage switching valve (3) is provided with an oil outlet passage (33) in communication with the first oil inlet passage (32), and a one-way valve assembly (5) for preventing the backflow of the oil outlet passage (33) is disposed between the first oil inlet passage (32) and the oil outlet passage (33); a lower end of the piston rod (2) is connected with a piston head (21) for opening or closing the first oil inlet passage (32); a return oil inlet passage (22) is disposed at the bottom of the piston head (21); a return oil chamber (23) in communication with the return oil inlet passage (22) is disposed inside the piston head (21); a return oil outlet passage (24) communicating the return oil chamber (23) and the piston cylinder oil storage chamber (11) is disposed on the piston head (21); a one-way return oil assembly (6) is mounted between the return oil inlet passage (22) and the return oil outlet passage (24) in the return oil chamber (23); the one-way return oil assembly (6) is used to prevent the return oil outlet passage (24) from flowing back to the return oil inlet passage (22).

2. The hydraulic jack of claim 1, wherein a thread column (20) is disposed at the bottom end of the piston rod (2); a thread hole (211) is disposed on the piston head (21); the thread hole (211) is tread-connected to the thread column (20); the one-way return oil assembly (6) comprises a return oil spring (61), a return oil press rod (62) and a return oil steel bead (63); a step (621) is disposed on the return oil press rod (62); the return oil spring (61) is sleeved on the return oil press rod (62), an upper end of the return oil spring (61) is abutted against the thread column (20), and a lower end of the return oil spring (61) is abutted against the step (621); the return oil steel bead (63) is located between the return oil press rod (62) and the return oil inlet passage (22), and a diameter of the return oil press rod (62) is greater than a hole diameter of the return oil inlet passage (22); the return oil press rod (62) abutted against the return oil steel bead (63) to close the return oil inlet passage (22).

3. The hydraulic jack of claim 2, wherein a length of the thread column (20) is less than a length of the thread hole (211) and an adjusting screw (210) is thread-connected in the thread hole (211); the adjusting screw (210) is located between the return oil press rod (62) and the thread column (20); an upper end of the return oil spring (61) is abutted against the adjusting screw (210) and a lower end of the return oil spring (61) is abutted against the return oil press rod (62).

4. The hydraulic jack of claim 2, wherein the bottom of the return oil press rod (62) is provided with an upwardly-concave steel bead limiting recess (622); the top of the return oil steel bead (63) is limited in the steel bead limiting recess (622).

5. The hydraulic jack of claim 2, wherein the section of the return oil inlet passage (22) is axially disposed and the section of the return oil outlet passage (24) is radially disposed; when closing, the return oil steel bead (63) is located below the return oil inlet passage (22).

6. The hydraulic jack of claim 1, wherein a sealing ring (212) is disposed around a lower portion of the piston head (21); and the sealing ring (212) is abutted between the piston head (21) and the piston cylinder (1).

7. The hydraulic jack of claim 2, wherein the section of the first oil inlet passage (32) is axially disposed, and the oil passage switching valve (3) is provided with a second oil inlet passage (34) in communication with the internal cylinder oil storage chamber (41); the section of the second oil inlet passage (34) is axially disposed; the oil passage switching valve (3) is provided with an inlet oil converging passage (35); the section of the inlet oil converging passage (35) is radially disposed, and the inlet oil converging passage (35) communicates respectively with an oil outlet end of the first oil inlet passage (32) and an oil outlet end of the second oil inlet passage (34); the section of the oil outlet passage (33) is axially disposed, an oil inlet end of the oil outlet passage (33) communicates with an oil outlet end of the inlet oil converging passage (35), and the one-way valve assembly (5) is disposed inside the inlet oil converging passage (35).

8. The hydraulic jack of claim 7, wherein the inlet oil converging passage (35) comprises a converging small passage (351) and a converging large passage (352); the converging small passage (351) communicates respectively with the oil outlet end of the first oil inlet passage (32) and the oil outlet end of the second oil inlet passage (34); the one-way valve assembly (5) comprises a small steel bead (51), a small spring (52), a large steel bead (53) and a large spring (54); the small steel bead (51) is located within the converging small passage (351) and the large steel bead (53) is located within the converging large passage (352); an end of the small spring (52) is abutted against the small steel bead (51) to close the oil outlet end of the second oil inlet passage (34); the other end of the small spring (52) is abutted against one side of the large steel bead (53); one end of the large spring (54) is abutted against the other side of the large steel bead (53) to enable the large steel bead (53) to close the converging small passage (351); the other end of the large spring (54) is abutted against one end of the converging large passage (352).

9. The hydraulic jack of claim 8, wherein a spring limiting column (36) is axially disposed at an end of the converging large passage on the oil passage switching valve (3), and the large spring (54) is abutted against the spring limiting column (36).

10. The hydraulic jack of claim 1, wherein it further comprises a base (7), an external cylinder (8), a top cover (9), and a top plate assembly (10); the base (7) is fixedly connected to the bottom of the internal cylinder (4); the external cylinder (8) is sleeved outside the internal cylinder (4) and connected to the internal cylinder (4) in a lift-sliding manner; an external cylinder oil storage chamber (81) is formed between the external cylinder (8) and the internal cylinder (4); the top cover (9) is fixedly connected to the top of the external cylinder (8), and the top cover (9) is connected with a handle assembly (91); a handle limiting sleeve (92) is sleeved on a peripheral wall of the external cylinder (8) and a handle limiting clamping mouth (93) matching the handle assembly (91) is disposed on the handle limiting sleeve (92); the top plate assembly (10) is fixed on the external cylinder (8) in a lift-adjustable manner.

* * * * *